April 15, 1958 P. AMERIO 2,830,799
REFRIGERATING PLATE UNIT
Filed Dec. 22, 1954
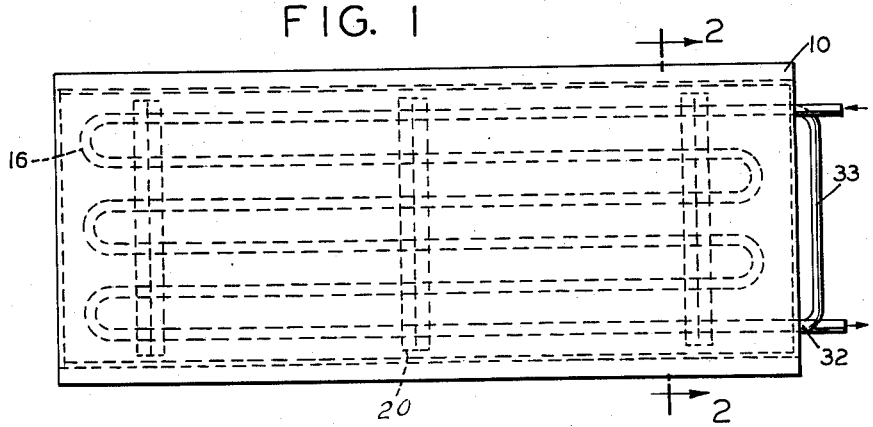
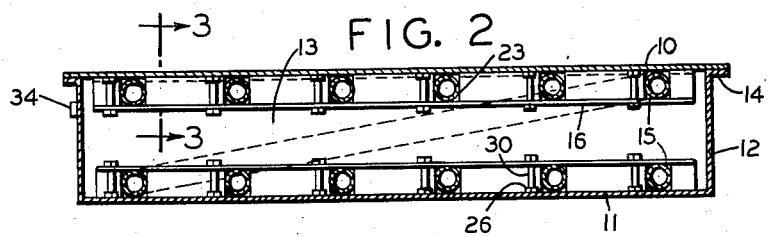
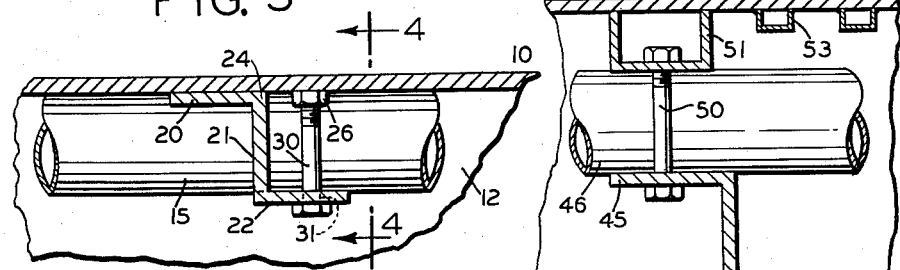
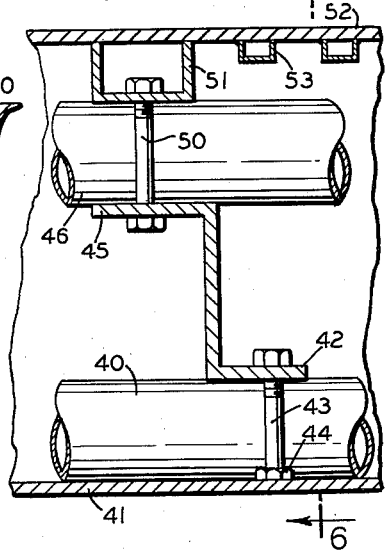
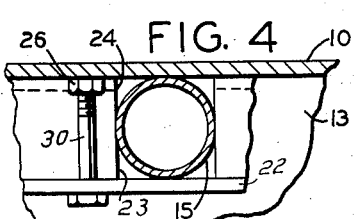
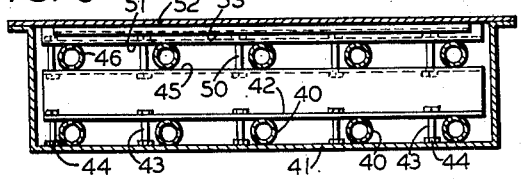
INVENTOR.
PASQUALE AMERIO
BY *John P. Chandler*
*his* ATTORNEY.

United States Patent Office 2,830,799
Patented Apr. 15, 1958

2,830,799

REFRIGERATING PLATE UNIT

Pasquale Amerio, Erskine Lakes, N. J.

Application December 22, 1954, Serial No. 476,977

3 Claims. (Cl. 257—256)

This invention relates to plate units which are used in refrigerating devices and relates more particularly to a novel plate unit of the closed type employing internal cooling coils and a fluid refrigerating medium surrounding the coils and wherein the temperature of the fluid is reduced sufficiently to cause it to be a slushy mass.

Refrigerating plates of this general character comprise a relatively thin, plat housing provided with two opposed walls of considerable area connected by shallow side walls and when the fluid freezes a natural expansion occurs causing a bulging of the opposed flat walls.

An important object of the present invention is to provide a plate unit of the character described wherein the cooling coils are also employed as a structural reinforcement for at least one of the opposed flat walls in order to maintain them in their initial planar condition at all times and temperatures.

This problem of bulging of the opposed plane walls of the plates is absent in plates wherein a fluid refrigerating medium is not employed and wherein air within the housing is evacuated and the housing sealed. In refrigerated trucks, however, it is necessary to employ the brine solution in the plate units since the truck is refrigerated at night and is thereafter used all day without the brine solution becoming completely liquid. Also in many fixed installations the use of the brine-containing plate units is preferred since the units remain at low temperatures for a long period of time which is of considerable importance, especially in cases of inevitable power failures.

In most instances the flow of refrigerant through the coils is resumed before the brine element has passed to a completely fluid phase but the variation in temperature is generally at least 30° F. and this continuing cycle imposes unusual strains upon the housing by stressing the opposed flat walls beyond their elastic limits and causing the plate to rupture in a short time.

In accordance with the present invention an evaporating coil is secured at a number of spaced points to at least one of the two flat walls, the coil being formed from a single length of tubing bent into serpentine shape to provide a number of substantially parallel tube sections which are disposed longitudinally of the plate unit.

In one form of the invention one coil is secured to one plate and a second coil to the opposite plate, thus giving a structural reinforcement to the plate walls so that they always maintain their flat condition regardless of the internal expansion of the refrigerating fluid. In a second form of the invention one coil is secured to one plate wall and the opposite plate wall is reinforced by angle bars.

In the drawings:

Fig. 1 is a plan view of a refrigerating plate embodying the present invention.

Fig. 2 is a transverse section taken on line 2—2 of Fig. 1.

Fig. 3 is a broken section taken on line 3—3 of Fig. 2.

Fig. 4 is a broken section taken on line 4—4 of Fig. 3.

Fig. 5 is a broken longitudinal section taken through a modified form of the invention.

Fig. 6 is a broken section taken on line 6—6 of Fig. 5.

One plate unit of the present invention includes an upper wall 10 and a lower wall 11. The upper wall 10 is flat over its entire area and lower wall 11 is box-like in shape and has shallow side walls 12, end walls 13 and marginal flanges 14 which are welded to the lower margins of upper wall 10. Each evaporating coil is formed from a single length of tubing 15 which is bent back upon itself at 16 to form a generally serpentine shape. The coils are secured to the upper and lower plates by means of a plurality of spaced, substantially Z-shaped angle brackets, each including an upper flange 20 which is secured to the plate as by means of welding, an intermediate flange 21 at right angles thereto and a lower flange 22.

The intermediate flange 21 has square notches 23 therein through which the tube 15 passes and for convenience in manufacture these notches extend through the full width of flange 20 as shown at 24 (Fig. 4). The distance between the inner face of flange 22 and the inner surface of the plate is equal to the outside diameter of the tube and accordingly it will be seen that the tubes are held in firm engagement with the surfaces of the plate. To give additional support to the tubes and accordingly to the plates a plurality of nuts 26 are welded to the inner surface of plates 10 and 11 and after the tubes are in place a headed screw 30 passes through an opening 31 in flange 22 and these screws are received in nuts 26.

One end wall is formed with four openings to receive the terminals 32 of the coils. One terminal from each coil is joined with a terminal from a second coil externally of the housing by a pipe 33.

After the housing has been suitably welded to form a closed unit a refrigerating fluid or brine is poured into the unit through an opening which is thereafter closed by a plug 34. The housing should be filled to about 90 percent of its capacity so as to enable the contents to expand into the unfilled area as the liquid mass becomes less fluid.

In the modified form of the invention shown in Figs. 5 and 6 the coils 40 are secured only to the lower wall 41 of the housing and in this instance a plurality of spaced Z bars are transversely disposed and the lower flange 42 of each bar overlies the coil and bolts 43 pass through the flange and are secured by a nut 44 welded to the lower wall.

The upper flange 45 forms a support for the upper coil 46 and the coil is secured thereto by bolts 50 passing through transverse channels 51 which engage the upper surfaces of the coil. The upper plate 52 is reinforced transversely by means of a plurality of transverse channels 53 which are of lesser width than channels 51.

What I claim is:

1. In a plate unit for a refrigerating apparatus, a closed housing including two flat plates and shallow side walls joining the plates, a plurality of generally flat evaporating coils mounted in superimposed relation within the housing, each coil being formed from a length of tubing bent back and forth upon itself to form a plurality of generally parallel tube sections, and a plurality of spaced angle bars between the coils and being disposed generally at right angles to the tube sections, means securing the angle bars to the upper coil and to the lower plate to provide longitudinal and transverse reinforcement therefor, transverse angle bars secured to the upper faces of the upper coil and contacting the inner face of the upper plate, and transverse angle bars secured to the inner face of the upper plate.

2. In a plate unit for a refrigerating apparatus, a closed housing including two flat plates and shallow side walls joining the plates, a plurality of generally flat evaporating coils mounted in superimposed relation within the housing, each coil being formed from a length of tubing bent back and forth upon itself to form a plurality of generally parallel tube sections, and a plurality of spaced angle bars separating the coils, means securing the angle bars to the upper coil and to the lower plate to provide reinforcement therefor, and transverse angle bars secured above the upper coil and contacting the inner face of the upper plate.

3. In a plate unit for a refrigerating apparatus, a closed housing including two flat plates and shallow side walls joining the plates, a plurality of generally flat evaporating coils mounted in superimposed relation within the housing, each coil being formed from a length of tubing bent back and forth upon itself to form a plurality of generally parallel tube sections, and a plurality of spaced angle bars between the coils and disposed generally at right angles to the tube sections, each bar having an intermediate vertical section and upper and lower horizontal sections which contact the upper and lower coils, means securing the upper horizontal section to the upper coil and the lower horizontal section to the lower plate to provide reinforcement therefor, and transverse angle bars secured to the inner face of the upper plate.

References Cited in the file of this patent

UNITED STATES PATENTS

| | | |
|---|---|---|
| 2,217,702 | Kleist | Oct. 15, 1940 |
| 2,241,411 | McGuffey | May 13, 1941 |
| 2,602,649 | Goldberg | July 8, 1952 |
| 2,672,324 | Weiss | Mar. 16, 1954 |